United States Patent [19]

Rosaen et al.

[11] 4,265,761

[45] May 5, 1981

[54] FLUID FILTERING DEVICE

[76] Inventors: Borje O. Rosaen, 4031 Thornoaks Dr.; Dale P. Fosdick, 3000 Hunting Valley Dr., both of Ann Arbor, Mich. 48104

[21] Appl. No.: 76,393

[22] Filed: Sep. 17, 1979

Related U.S. Application Data

[63] Continuation-in-part of Ser. No. 963,034, Nov. 22, 1978, Pat. No. 4,197,207.

[51] Int. Cl.$^3$ .......................................... B01D 35/02
[52] U.S. Cl. ................................... 210/315; 210/447; 210/452
[58] Field of Search ............... 210/349, 359, 388, 389, 210/390, 398, 399, 436, 446, 447, 448, 451, 452, 472, DIG. 14, 315

[56] References Cited

U.S. PATENT DOCUMENTS

| 2,761,529 | 9/1956 | Wisenbaugh | 210/452 |
|---|---|---|---|
| 2,937,754 | 5/1960 | Kasten | 210/447 |
| 3,366,240 | 1/1968 | Gruber | 210/447 |
| 3,384,242 | 5/1968 | Kudlaty et al. | 210/436 |
| 4,018,686 | 4/1977 | Shufflebarger | 210/448 |

*Primary Examiner*—Ivars C. Cintins
*Attorney, Agent, or Firm*—Gifford, Van Ophem, Sheridan & Sprinkle

[57] ABSTRACT

A fluid filtering device is provided for connection with a fluid line. The fluid device includes a housing having a fluid inlet on one end, a fluid outlet on the other end and a fluid passage formed through the housing. The fluid passage connects the inlet with the outlet and includes a port formed along its length. A tubular filter element open at one end is removably insertable into a filter chamber formed within the housing and, upon insertion, is axially slidable between a first position in which the open end of the filter element abuts against the fluid port and a second position in which the open end of the filter element is spaced from the fluid port. A spring urges the filter element toward its first position. In operation the fluid flow into the housing inlet passes through the port and into the interior of the filter element. The fluid then flows through the filter element and to the housing outlet. When the filter element becomes clogged, the resulting increase in differential pressure across the filter element forces the filter element to or towards its second or retracted position which enables direct fluid flow from the inlet and to the outlet while bypassing the filter element. In addition, a filter member is secured across the other axial end of the filter element to permit fluid flow axially through the interior of the filter element, through the filter member and to the fluid outlet. When the filtering device is used as a suction line filter, a bleed is provided through the housing and open to the outlet side of the filter member to prevent air accumulation.

9 Claims, 3 Drawing Figures

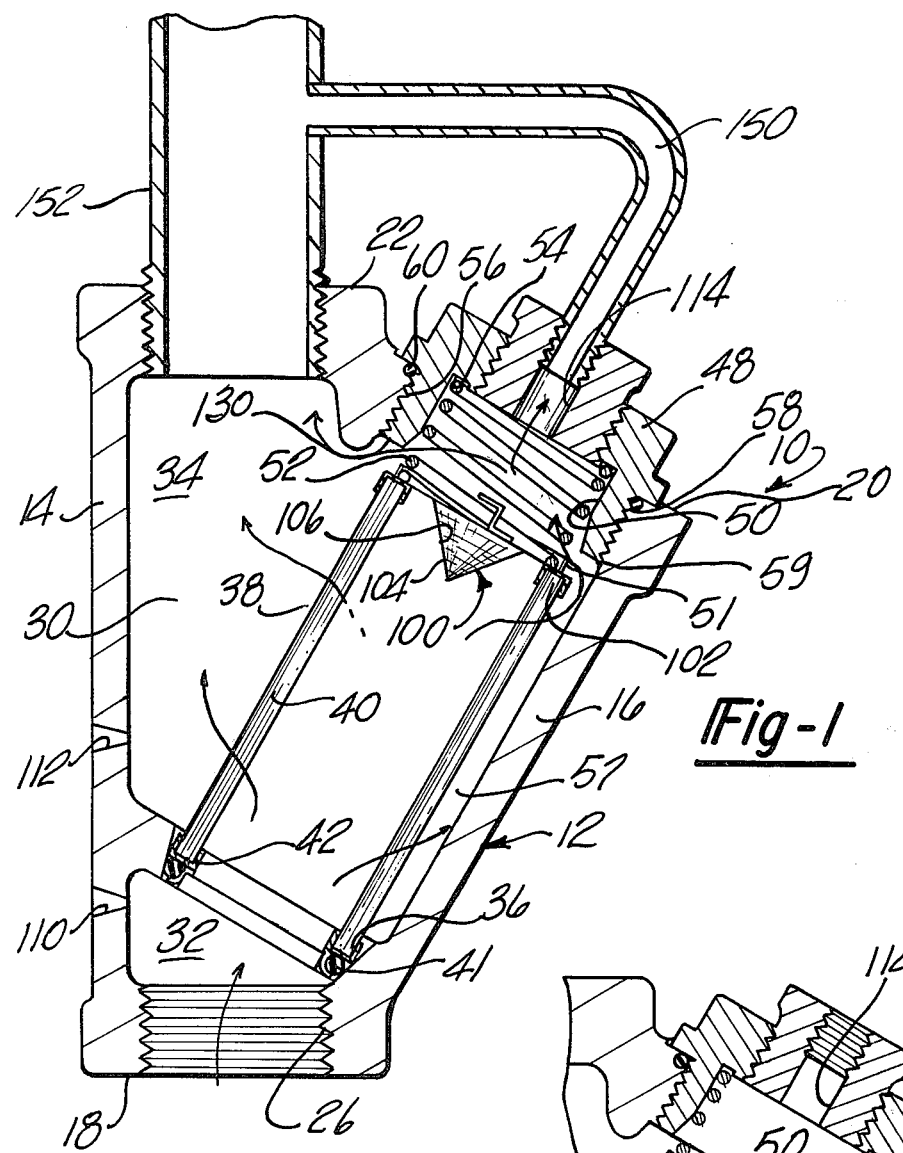
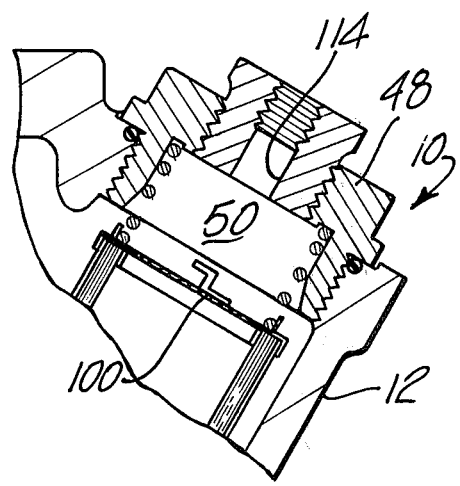
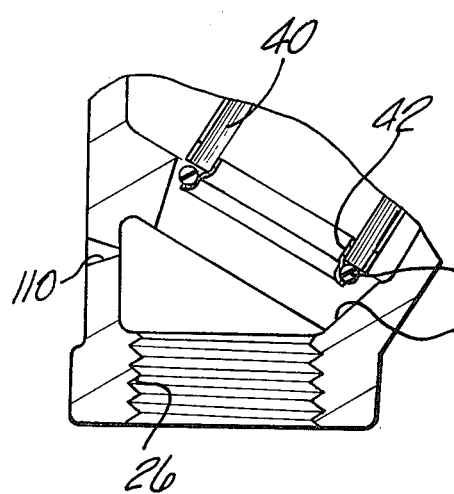

FLUID FILTERING DEVICE

CROSS REFERENCE

This application is a continuation-in-part application of U.S. Ser. No. 963,034 filed Nov. 22, 1978, now U.S. Pat. No. 4,197,207 and entitled FLUID FILTERING DEVICE.

BACKGROUND OF THE INVENTION

I. Field of the Invention

The present invention relates generally to fluid filtering devices and, more particularly, to a fluid filtering device with a filter element bypass means.

II. Description of the Prior Art

There are, of course, a number of previously known fluid filtering devices which are adapted for connection in series with a fluid line in a fluid system. Such a fluid system can, for example, comprise a hydraulic system in which the fluid filtering device is connected to either the suction line from a hydraulic reservoir and to the hydraulic system or the return line from the hydraulic system and to the fluid reservoir. It is necessary to maintain fluid flow in case of suction line filter installations in order to prevent pump cavitation with resultant erosive pump damage as well as power loss and noise. Fluid flow continuity must also be provided for in the case of pressure line and return line filter installations without a clogged filter causing damagingly high pressures.

It is well known in the art of fluid filtering devices that as a filter element becomes increasingly clogged with debris, the pressure drop across the filter element likewise increases and eventually may also diminish the outlet flow from the filter element. As the decrease in fluid flow, or the pressure, or both, become excessive, it can cause one or more of the aforementioned problems.

In order to protect the hydraulic or other fluid system from reduced fluid flow resulting from a clogged filter element, many previously known filtering devices include bypass means for bypassing the fluid flow around the filter element at a predetermined pressure drop across the filter element which is indicative of excess filter clogging. These previously known bypass means, however, are disadvantageous for several different reasons.

One disadvantage of these previously known bypass valves is that such valves are oftentimes complex in construction and are comprised of a multiplicity of separate elements. The complexity of these previously known bypass valves not only increases the initial construction or manufacturing costs of such valves but, in addition, such bypass valves are prone to failure since failure of any one of the numerous bypass valve components can render the valve inoperative.

Moreover, many of these previously known bypass valves simply comprise a valve member urged against a seat by a helical spring or other conventional resilient means. The valve member, which is of a relatively small area, forms the entire pressure sensing means and, due to its relatively small area size, the bypass valve member opens only slightly and somewhat spasmodically. Consequently, the fluid flow through the filter device, even with the bypass valve in its open position, is often at a lower than desired flow rate.

A still further disadvantage of these previously known bypass valves is that such bypass valves are typically secured directly to and within the housing for the fluid device. Consequently, when maintenance and/or cleaning of the bypass valve assembly is required, time consuming disassembly of virtually the entire fluid filtering device is usually required. Such disassembly of the fluid filter device also results in expensive and prolonged downtime for the hydraulic system.

A still further disadvantage of these previously known filtering devices, particularly when used as a suction line filter, is that entrained air is permitted to accumulate in pockets at high points and then pass in significant quantities. Cavitation is then experienced in pumps with eventual erosive damage. Noise occurring during such cavitation frequently results in considerable time loss and labor cost looking for nonexistent air leaks.

SUMMARY OF THE PRESENT INVENTION

The present invention provides a simple and inexpensive fluid filtering device for connection with a fluid line which overcomes the above mentioned disadvantages of the previously known filter devices.

In brief, the filter device according to the present invention comprises a housing having a fluid inlet at one end, a fluid outlet at the other end, and a fluid passageway connecting the inlet with the outlet. A fluid port is formed along the length of the fluid passageway.

A filter assembly is also provided for connection with the housing and includes a tubular filter element which is open at one axial end. The filter assembly is removably insertable into the housing so that the open axial end of the filter element abuts against the fluid port whereby the fluid flow into the inlet of the housing passes through the open axial end of the filter element and into the interior of the filter element. The outer periphery of the filter element is, in turn, open to the fluid passageway at the outlet side of the filter device.

A filter member may be positioned across the other axial end of the filter so that a first side of the filter member is open to the interior of the filter element while the other side of the filter member is open to the fluid outlet. An additional port is provided through the housing and is open to the second side of the filter member. By this construction, air, which would otherwise separate from the fluid, accumulate, and pass in harmfully large quantities, is hereby kept entrained in the fluid. Air accumulation is prevented by ensuring continuous movement in all fluid spaces.

Unlike the previously known fluid filtering devices, the filter element is axially slidable between an extended position, in which the free end of the filter element abuts against and sealingly engages the fluid port, and a retracted position in which the free end of the filter element is spaced away from the fluid port. In its retracted position, the filter element permits the fluid flow through the filter device to bypass directly from the inlet and to the outlet. A helical spring urges the filter element towards its extended position.

In operation, as the filter element becomes clogged, the inlet fluid pressure, i.e., the pressure on the interior of the filter element, increases in the conventional fashion. At a predetermined degree of filter clogging, the pressure on the interior end of the filter element overcomes the force of the helical spring and forces the filter element toward its retracted position and permits fluid to bypass through the port directly from the inlet and to the outlet. Moreover, since the entire end interior surface of the filter element forms the fluid pressure sensing means, the axial displacement of the filter element is not only smooth but also enables a large volumetric flow rate through the filter device during a bypassing condition.

The fluid filtering device can also include one or more ports to measure the fluid pressure within the interior of the filter device. For example, if the device is used as a suction line filter, a vacuum port is open to the fluid outlet and connected to a vacuum gage. The vacuum at the fluid outlet is indicative of the degree of clogging of the filter element. Similarly, a pressure gage can be connected to the fluid inlet via a pressure port for a return line filter so that the fluid pressure reading on the pressure gage is indicative of the degree of clogging of the filter element. For an in line filter, a differential pressure gage is connected to ports open both to the fluid inlet and the fluid outlet so that the differential pressure gage reading is indicative of the degree of clogging of the filter element.

BRIEF DESCRIPTION OF THE DRAWING

The present invention will be more clearly understood upon reference to the following detailed description, when read in conjunction with the accompanying drawing, wherein like reference characters refer to like parts throughout the several views, and in which:

FIG. 1 is a longitudinal sectional view illustrating the fluid filtering device according to the present invention;

FIG. 2 is a fragmentary sectional view showing a modification of the present invention; and FIG. 3 is a fragmentary sectional view illustrating the fluid filtering device of the present invention in a bypass condition.

DETAILED DESCRIPTION OF THE PRESENT INVENTION

With reference first to FIGS. 1 and 2, the fluid filtering device 10 according to the present invention is thereshown and comprises a housing 12 having a first substantially cylindrical portion 14 and a second substantially cylindrical portion 16. The housing portions 14 and 16 acutely intersect at one end 18 of the housing 12 so that the free end 20 of the housing portion 16 lies closely adjacent the free end 22 of the housing portion 14. The housing portions 14 and 16 are integrally formed with each other.

A fluid outlet 24 is formed at the end 22 of the housing portion 14 while a fluid inlet 26 is formed at the opposite end 18 of the housing portion 14. Both the fluid inlet 26 and outlet 24 are adapted to receive conventional fluid couplings and, for this purpose, both the fluid inlet 26 and outlet 24 are internally threaded.

A fluid passageway 30 fluidly connects the fluid inlet 26 to the outlet 24 in the housing portion 14 and comprises a fluid inlet chamber 32 open to the housing inlet 26 and a fluid outlet chamber 34 open to the housing outlet 24. A fluid port 36 closely adjacent the inlet 26 fluidly connects the fluid chambers 32 and 34 together. The fluid port 36 is tapered or frustoconical in shape having its base facing and coaxial with the free end 20 of the second housing portion 16 for a reason to be shortly described.

A filter assembly 38 is provided for connection with the housing 12 and comprises a tubular cylindrical filter element 40 open at one end 42. FIG. 1 shows a filter member 100 disposed across its other axial end 102. As shown in FIG. 1, the filter member 100 is generally conical in shape for increased surface area and has its apex extending axially into the interior of the filter element 40 so that one side 104 of the filter member 100 is in fluid communication with the interior of the filter element 40.

A modification of the filter member 100 is shown in FIG. 2 in which the filter member 100 is planar and extends axially across the end 102 of the filter element 40. The filter element 100 is preferably constructed of wire cloth and, although it has less surface area than the conical filter member 100 shown in FIG. 1, it is less expensive in construction.

The filter element assembly 38 further includes an end plug 48 having a central axial cavity 50 and with an annular abutment surface 54 at its inner end. A helical spring 52 is positioned within the cavity 50 and abuts at one end against a spring retainer 51 secured to the filter element assembly 38 and, at its other end, against the annular abutment surface 54 formed at the base of the cavity 50. As will become hereinafter apparent, the opening pressure for the relief valve 10 can be varied by changing the spring constant and/or length of the spring 52.

The free end 20 of the second housing portion 16 is open via a threaded bore 56 greater in diameter than the filter element 40 while the cap 48 includes external threads 58 at one end 59 which threadably cooperates with the bore 56. The filter element 40 is thus axially insertable through the bore 56 and into a filter chamber 57 and the filter element assembly 38 can be removably attached to the housing 12 by screwing the cap 48 into the bore 56. Upon doing so, an annular seal 41 carried at the free end 42 of the filter element 40 abuts against and sealingly engages the port 36 which otherwise connects the inlet chamber 32 to the outlet chamber 34. A conventional O-ring seal 60 is also preferably provided between the cap 48 and the housing portion 16 to prevent fluid leakage between the cap 48 and the housing 12.

With reference particularly to FIG. 1, the inner end of the cap 48 forms an annular abutment surface 130 which is dimensioned so that it can abut against the end 102 of the filter element 40 and thus limit the axial travel of the filter element 40. Moreover, with the free end 42 of the filter element 40 nested in the port 36 as shown in FIG. 1, the abutment surface 130 is spaced from the end 102 of the filter element 40 by a distance less than the axial extension of the free end 42 of the filter element 40 into the port 36. This construction insures that, even with the filter element 40 in its most retracted position (FIG. 3), a portion of the free end 42 of the filter element 40 remains within the port 36. Consequently, it is impossible for the filter element 40 to pop out from the port 36 and possibly become stuck in an open position.

With the end cap 48 attached to the housing 12 in the previously described fashion, the helical spring 52 urges the free end 42 of the filter element toward and against the port 36. The spring 52 also serves, in conjunction with the shape of the port 36, to align the blind or free end 42 of the filter element 40 with the port 36. The other end 102 of the filter element 40, however, is axially spaced from the inner end 59 of the cap 48 so that the filter element 40 can retract towards the cap 48 for a predetermined distance. This retraction distance is, however, less than the distance of insertion of the free end 42 into the port 36 so that even with the filter element 40 retracted, the free end 42 of the filter element 40 partially remains within the port 36.

With reference to FIG. 1, the other side 106 of the filter member 100 is open to the cavity 50 which, in turn, is open to the outlet chamber 34 through openings between the coils of the helical spring 52. In a fashion which will be subsequently described in greater detail, fluid can flow axially through the interior of the filter element 40, through the filter member 100 and into the outlet chamber 30 via the cap cavity 50.

One or more gage ports 110 and 112 are preferably formed through the housing 12 so that one port 110 is open to the outlet chamber 34. The port 112 could, alternatively, be formed through the cap 48.

With reference now to FIGS. 1 and 3, the operation of the fluid filtering device 10 according to the present invention will now be described. FIG. 1 depicts the fluid filtering device in its filtering position in which the helical spring 52 urges the free end 42 of the filter element 40 toward the port 36 and so that the seal sealingly engages the port 36. Thus, fluid flow into the inlet 26 enters the interior of the filter element 40 through its open end and passes radially outward through the filter element 40 and into the outlet chamber 34 of the fluid passageway 30.

A portion of the fluid, however, flows axially through the interior of the filter element 40 and passes through the filter member 100, into the cavity 50 and finally into the outlet chamber 34. In practice it has been found particularly when the filtering device is used as a suction line filter, that some of the air entrained with the fluid continuously separates from the fluid as the fluid flows through the assembly. The air collects at high points such as within the cavity 50. In the preferred form of the invention, a conduit 150 is connected at one end to an air bleed passageway 114 formed in the cap 48 and at its other end is connected to a conduit 152 connected to the device outlet 24. The conduit is open to the cavity 50 and continuously feeds air entrained within the influent to the effluent and thus prevents the accumulation of large air pockets which can degrade system performance upon release into the fluid stream.

As the filter element 40 removes foreign debris from the fluid and the filter element 40 becomes increasingly clogged, the fluid pressure within the interior of the filter element 40 likewise increases with respect to the fluid pressure from the outlet chamber 34. When the fluid pressure within the interior of the filter element 40 increases past a predetermined amount, as determined by the helical spring 52, the fluid pressure forces the filter element 40 toward its retracted position and against the force of the helical spring 52. In doing so, the free end 42 of the filter element 40 moves away from the fluid port 36 thus permitting a portion of the fluid flow through the device 10 to bypass directly from the inlet chamber 32, through the port 36 and to the outlet chamber 34. The opening pressure can be simply changed by changing the spring 52.

During the continued operation of the fluid filtering device 10, a portion of the fluid will continue to pass into the interior of the filter element 40 and through the filter element 40 thus further clogging the filter element 40 with debris. The further clogging of the filter element 40 in turn further increases the pressure within the interior of the filter element 40 and thus further displaces the filter element 40 towards the cap 48. In this manner the filter element 40 gradually, but steadily, moves from its extended or filtering position and towards its retracted or bypassing position shown in FIG. 3. The volumetric rate of fluid bypassing the filter element increases with the amount of retraction of the filter element 40.

The continued flow of fluid through the filter element 40 after the initiation of fluid bypassing is greatly enhanced by aligning the axis of the filter element 40 at a sharply acute angle with respect to the axis of the fluid passageway 30. By this construction, the momentum of the influent into the filter device 10 naturally carries the fluid into the interior of the filter element 40.

The degree of clogging of the filter assembly 38 can be determined, if desired, by connecting appropriate gages (not shown) to the gage ports 110 and 112. For example, if the device is used as a suction line filter, a vacuum gage is connected to the port 112. The vacuum gage reading is then indicative of the degree of clogging of the filter element 40. Similarly, a pressure gage (not shown) can be connected to the port 110 for a return line filter so that the fluid pressure reading on the pressure gage is indicative of the degree of clogging of the filter element 40. If the device 10 is used in a pressure line as an inline line filter, a differential pressure gate (not shown) is connected to the ports 110 and 112 so that the differential pressure gage reading is indicative of the degree of clogging of the filter element 40.

From the foregoing it can be seen that the fluid filtering device 10 according to the present invention is of a simple and inexpensive construction and yet is totally effective in use. Moreover, since the entire end cross-section of the filter element 40 forms the bypass pressure sensing means, the retraction of the filter element from its extended and to its retracted position is not only smooth and steady but also insures a large fluid flow when the filter element 40 is in its bypass position.

The present invention has a further advantage in that the filter element 40 forms the bypass valve itself thereby eliminating the need for separate, complex and expensive bypass valve means. Moreover, the entire filter assembly 38, including the bypass means, can be simply, easily and rapidly removed from the housing 12 by merely unscrewing the cap 48 and removing the filter assembly. Thus, the bypass means can be cleaned, repaired or replaced exteriorly of housing 12 while a substitute filter assembly can ensure continued operation of the filter device 10.

The present invention has a further advantage in that the filter member 100 increases the volumetric capacity of the filter assembly 38 as compared to the filter element 40 alone and also increases the amount of debris which can be removed by the filter assembly 38 as compared to the filter element 40 alone before replacement or cleaning is required.

Having described my invention, however, many modifications thereto will become apparent to those skilled in the art to which it pertains without deviation from the spirit of the invention as defined by the scope of the appended claims.

We claim:

1. A fluid filtering device for connection with a fluid line, said device comprising:
a housing having a fluid inlet and a fluid outlet substantially aligned with each other;
fluid passage means formed in said housing for connecting said inlet to said outlet, said passage means including a port formed along its length and adjacent the fluid inlet;
said housing further comprising a first substantially tubular cylindrical portion having said inlet formed at one end and said outlet formed at the other end, said housing further comprising a second substantially tubular cylindrical portion intersecting said first portion at said port and branching outwardly from said first portion at an acute angle, said first housing portion defining an outlet chamber open to said outlet and said second portion defining a filter chamber open along one entire side to said outlet chamber, a tubular filter element open at one end;

means for axially slidably mounting said filter element in said filter chamber between a first and second axial position, wherein in said first position the open end of said filter element abuts against said port so that the interior of said filter element is open to the housing inlet while the exterior of the filter element is open to the housing outlet, and wherein in said second position said open end of the filter element is spaced from the port to thereby enable fluid flow through the passage means to bypass the filter element;

means for resiliently urging said filter element toward said first position;

said mounting means further comprising a cap secured to the other end of the second housing portion, and an air bleed conduit fluidly connected at one end to said outlet and fluidly connected at its other end to an opening formed through said cap wherein said cap opening is aligned with the interior of the filter element.

2. This invention as defined in claim 1 wherein said filter element is cylindrical in shape and wherein said port is frustoconical in shape, said port being coaxial with the filter element and having its base facing the filter element.

3. The invention as defined in claim 1 wherein said port is frustoconical in shape having its base facing the filter element, said filter element being cylindrical in shape, and said port being coaxial with the second housing portion so that said port forms a seat for the free end of the filter element.

4. The invention as defined in claim 1 and further comprising means formed on the end cap for detachably connecting said cap end to the other end of the second housing portion, said filter element being removably insertable through said other end of the second housing portion and a resilient means being disposed between said end cap and said filter element.

5. The invention as defined in claim 4 wherein said end cap includes a cavity in which one end of the resilient means is received, and wherein said other end of the air bleed conduit is open to said cavity.

6. The invention as defined in claim 1 wherein in said first position said filter element axially extends into said port by a predetermined distance, said device further comprising means for limiting the axial displacement distance less than said predetermined distance.

7. The invention as defined in claim 6 wherein said limiting means comprises an abutment surface formed on said mounting means which registers with the other end of the filter element.

8. The invention as defined in claim 1 and further comprising a filter member disposed across the other end of the filter element.

9. The invention as defined in claim 8 wherein said filter member is conical in shape having its apex extending into the interior of the filter element.

* * * * *

UNITED STATES PATENT AND TRADEMARK OFFICE
CERTIFICATE OF CORRECTION

PATENT NO. : 4,265,761
DATED : May 5, 1981
INVENTOR(S) : Borje O. Rosaen and Dale P. Fosdick It is certified that error appears in the above-identified patent and that said Letters Patent are hereby corrected as shown below:

Column 5, line 9, after "to", insert --the inlet chamber 32 while the other port 112 is open to--;

Column 5, line 11, delete "tively, be formed through the cap 48";

Column 6, line 21, delete "gate" and insert --gage-- therefor.

Signed and Sealed this

Eighteenth Day of August 1981

[SEAL]

Attest:

Attesting Officer

GERALD J. MOSSINGHOFF
Commissioner of Patents and Trademarks